United States Patent Office 3,293,243
Patented Dec. 20, 1966

3,293,243
8-ARYL-2,3,6,7-TETRAHYDRO-1,4-DIAZOCIN-5(4H)-ONES AND RELATED COMPOUNDS
Theodore S. Sulkowski, Haverford, Pa., assignor to American Home Products Corporation, New York, N.Y., a corporation of Delaware
No Drawing. Filed Mar. 10, 1964, Ser. No. 350,678
10 Claims. (Cl. 260—239.3)

This invention relates to 8-aryl-2,3,6,7-tetrahydro-1,4-diazocin-5(4H)-ones and to related compounds having pharmacodynamic activity.

The claimed compounds exhibit qualitatively varying therapeutic effects in mammals as central nervous system depressants, as stimulants and as anti-inflammatory agents.

The claimed compounds are represented by the following general formula:

$$\text{R'} \begin{array}{c} \text{O} \quad \text{R}^3 \\ \| \quad | \\ \text{C—N} \\ \diagup \quad \diagdown \\ \quad \quad \text{Z} \\ \diagdown \quad \diagup \\ \text{C=N} \\ | \\ \text{R}^2 \end{array} \quad (I)$$

in which the symbols employed have the meaning given below:

Z is a divalent radical such as a lower alkylene radical, preferably ethylene or propylene, optionally substituted by hydroxy or lower alkyl groups; or an o-phenylene group optionally substituted with one or more halogen atoms.

R' is hydrogen, lower alkyl having from one to five carbon atoms, or phenyl, located on either the carbon atom linked to that bearing the oxo group or to the carbon atom linked to the carbon atom bearing the $R^2$ substituent.

$R^2$ is lower alkyl, phenyl, or phenyl substituted in the o, m, or p-positions by halogen, lower alkoxy, lower alkyl or hydroxy; or a 5- or 6-membered heterocyclic radical such as 2- or 3-thienyl, 2-, 3- or 4-pyridyl or 2-, or 3-furyl;

$R^3$ is hydrogen or lower alkyl, as above defined.

The compounds of Formula I, above, readily form pharmaceutically acceptable acid addition salts with inorganic or organic acids, such as, for example, but without limitation, hydrochloric acid, sulfuric acid and fumaric acids.

As used herein, the suffix "diazonin" refers to those compounds of Formula I where Z is a divalent trimethylene radical. The suffix "diazocin" refers to those compounds of Formula I where Z is a divalent ethylene or o-phenylene radical.

As shown graphically in the reaction scheme below, the claimed compounds advantageously are prepared by condensing a 3-acyl or 3-aroyl-propionic acid (II) with an alkylene or phenylene diamine (III):

$$\text{R'} \begin{array}{c} \text{O} \\ \| \\ \text{C—OR} \\ \diagup \\ \diagdown \\ \text{C=O} \\ | \\ \text{R}^2 \end{array} + \text{R}^3\text{HN—Z—NH}_2 \longrightarrow \text{R}_1 \begin{array}{c} \text{O} \quad \text{R}^3 \\ \| \quad | \\ \text{C—N} \\ \diagup \quad \diagdown \\ \quad \quad \text{Z} \\ \diagdown \quad \diagup \\ \text{C=N} \\ | \\ \text{R}^2 \end{array}$$

(II)     (III)     (I)

In the above formulas, R', $R^2$, $R^3$ and Z have the same meaning previously given; R is hydrogen or lower alkyl as above defined.

The condensation whereby the products of this invention are prepared is carried out by refluxing the reactants in an inert solvent such as toluene for from 2 to 16 hours while continuously removing the water of reaction from the system. The end point of the condensation is reached when no more water distills over. At this point, the product is removed and recrystallized from ethanol or ethyl acetate.

The following examples in which all temperatures are in degrees centigrade represent the best mode of practicing this invention.

Example 1

Eighteen grams of 3-benzoylpropionic acid, 25 ml. of ethylenediamine and 200 ml. of toluene are refluxed 16 hours in a flask equipped with a water separator. The solution is evaporated to a solid residue. On recrystallization from ethyl acetate, there is obtained 8-phenyl-2,3,6,7-tetrahydro-1,4-diazocin-5(4H)-one, M.P. 124° C. When tested pharmacologically, this compound exhibited central nervous system depressant activity.

Example 2

Ten grams of 3-(p-methoxybenzoyl)propionic acid, 25 ml. of ethylenediamine, and 150 ml. of toluene are refluxed 18 hours in a flask equipped with a water separator. The solution is evaporated to a solid residue. On recrystallization from ethyl acetate there is obtained 8-(p-methoxyphenyl)-2,3,6,7 - tetrahydro - 1,4 - diazocin-5(4H)-one, M.P. 149° C. When tested pharmacologically, this compound exhibited central nervous system depressant and stimulant activities.

Example 3

Seven grams of 3-(α-thenoyl)propionic acid, 15 ml. of ethylenediamine, and 75 ml. of toluene are refluxed 4 hours in a flask equipped with a water separator. The solution is evaporated to a solid residue. On recrystallization from ethyl acetate/hexane there is obtained 2,3,6,7-tetrahydro-8-(2-thienyl) - 1,4 - diazocin - 5(4H)-one, M.P. 125° C. When tested pharmacologically, this compound exhibited central nervous system depressant activity.

Example 4

Fifteen grams of 3-(p-chlorobenzoyl)propionic acid, 25 ml. of ethylenediamine, and 75 ml. of toluene are refluxed 16 hours in a flask equipped with a water separator. The solution is evaporated to a solid residue. On recrystallization from aqueous ethanol there is obtained 8-(p-chlorophenyl)- 2,3,6,7 -tetrahydro - 1,4 - diazocin-5(4H)-one, M.P. 157–9° C. When tested pharmacologically, this compound exhibited central nervous system depressant, and stimulant activity.

Example 5

Seventeen grams of 3-benzoylpropionic acid, 15 ml. of propylenediamine, and 200 ml. of toluene are refluxed 14 hours in a flask equipped with a water separator. The solution is evaporated to a solid residue. On recrystallization from ethanol there is obtained 2,3,4,5,7,8-hexahydro-9-phenyl-6H-1,5-diazonin - 6 - one, M.P. 130–1° C. When tested pharmacologically, this compound exhibited central nervous system depressant activity.

Example 6

Ten grams of 3-benzoylpropionic acid, 15 ml. of 2-hydroxypropylenediamine, and 100 ml. of toluene are refluxed 15 hours in a flask equipped with a water separator. The solution is evaporated to a solid residue. On recrystallization from ethanol there is obtained 2,3,4,5,7,8-hexahydro-3-hydroxy - 9 - phenyl - 6H - 1,5-diazonin-6-one, M.P. 199–201° C. When tested pharmacologically, this compound exhibited tranquilizing activity.

Example 7

Fifteen grams of 3-(α-thenoyl)propionic acid, 15 ml. of propylenediamine, and 100 ml. of toluene are refluxed 15 hours in a flask equipped with a water separator. The solution is evaporated to a solid residue. On recrystallization from ethyl acetate there is obtained 2,3,4,5,7,8-hexahydro-9-(2-thienyl)-6H-1,5-diazonin-6-one, M.P. 163–5° C. When tested pharmacologically, this compound exhibited central nervous system depressant activity.

Example 8

Ten grams of ethyl 2-methyllevulinate, 6.5 g. of o-phenylenediamine, and 100 ml. of toluene are refluxed 14 hours in a flask equipped with a water separator. The solution is evaporated to a solid residue. On recrystallization from aqueous ethanol there is obtained 3,4-dihydro - 3,5 - dimethyl - 1,6 - benzodiazocin - 2(1H) - one, M.P. 118.5–120° C. When tested pharmacologically, this compound exhibited central nervous system depressant activity.

Example 9

Eighteen grams of 3-benzoylpropionic acid, 11 g. of o-phenylenediamine, and 200 ml. of toluene are refluxed 16 hours in a flask equipped with a water separator. The solution is evaporated to a solid residue. On recrystallization from ethanol there is obtained 3,4-dihydro-5-phenyl-1,6-benzodiazocin-2(1H)-one, M.P. 158–160° C. When tested pharmacologically, this compound exhibited anti-inflammatory activity.

When applying the steps of the foregoing examples to the known starting materials listed below, the corresponding products hereinafter set forth are obtained:

| Starting Materials | Products |
|---|---|
| 2-phenyl-3-benzoylpropionic acid and N-propylethylenediamine. | 6,8-diphenyl-4-propyl-2,3,6,7-tetrahydro-1,4-diazocin-5-(4H)-one. |
| 3-(p-dichloromethylbenzoyl)propionic acid and 2,3-diaminobutane. | 8-(p-dichloromethylphenyl)-2,3-dimethyl-2,3,6,7-tetrahydro-1,4-diazocin-5(4H)-one. |
| 2-methyl-3-benzoylpropionic acid and ethylenediamine. | 6-methyl-8-phenyl-2,3,6,7-tetrahydro-1,4-diazocin-5-(4H)-one. |
| 3-picolinoylpropionic acid and propylenediamine. | 2,3,4,5,7,8-hexahydro-9-(2-pyridyl)-6H-1,5-diazonin-6-one. |
| 3-nicotinoylpropionic acid and propylenediamine. | 2,3,4,5,7,8-hexahydro-9-(3-pyridyl)-6H-1,5-diazonin-6-one. |
| 3-isonicotinoylpropionic acid and propylenediamine. | 2,3,4,5,7,8-hexahydro-9-(4-pyridyl)-6H-1,5-diazonin-6-one. |
| 3-(2-furoyl)propionic acid and ethylenediamine. | 2,3,6,7-tetrahydro-8-(2-furyl)-1,4-diazocin-5(4H)-one. |
| 3-(3-furoyl)propionic acid and ethylenediamine. | 2,3,6,7-tetrahydro-8-(3-furyl)-1,4-diazocin-5(4H)-one. |
| 3-(3-furoyl)propionic acid and propylenediamine. | 2,3,4,5,7,8-hexahydro-9-(3-furyl)-6H-1,5-diazonin-6-one. |
| 3-(p-hydroxybenzoyl)propionic acid and ethylenediamine. | 8-(p-hydroxyphenyl)-2,3,6,7-tetrahydro-1,4-diazocin-5(4H)-one. |
| Ethyl 2-methyllevulinate and 1,2-diamino-4,5-dichlorobenzene. | 8,9-dichloro-3,4-Dihydro-3,5-dimethyl-1,6-benzodiazocin-2(1H)-one. |
| 3-benzoylpropionic acid and 2-hydroxy-N-pentylpropylenediamine. | 2,3,4,5,7,8-hexahydro-3-hydroxy-5-pentyl-9-phenyl-6H-1,5-diazonin-6-one. |

The compounds of this invention can be administered with pharmaceutically acceptable, inert carriers in a wide variety of oral or parenteral unit dosage forms containing 25, 100, 250 or 500 mg. of active ingredients for the symptomatic adjustment of the dosage, or in admixture with other active compounds.

The present invention also includes the process of bringing the compounds thereof into a form suitable for therapeutic administration by associating them with liquid or solid, pharmaceutically acceptable carriers.

What is claimed is:

1. A compound selected from the group consisting of compounds of the formula:

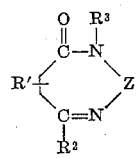

and their pharmaceutically acceptable acid addition salts, wherein Z is selected from the group consisting of ethylene, propylene and o-phenylene; R′ is selected from the group consisting of hydrogen, lower alkyl and phenyl; R² is selected from the group consisting of lower alkyl, phenyl, halophenyl, lower alkoxyphenyl, halo lower alkylphenyl, hydroxyphenyl, thienyl, pyridyl and furyl; and R³ is selected from the group consisting of hydrogen and lower alkyl.

2. 8-phenyl-2,3,6,7-tetrahydro-1,4-diazocin-5(4H)- one.

3. 8 - (p - methoxyphenyl) - 2,3,6,7 - tetrahydro - 1,4-diazocin-5(4H)-one.

4. 2,3,6,7 - tetrahydro - 8 - (2 - thienyl) - 1,4 - diazocin-5(4H)-one.

5. 8 - (p - chlorophenyl) - 2,3,6,7 - tetrahydro -1,4-diazocin-5(4H)-one.

6. 2,3,4,5,7,8 - hexahydro - 9 - phenyl - 6H - 1,5, - diazonin-6-one.

7. 2,3,4,5,7,8 - hexahydro - 3 - hydroxy - 9 - phenyl-6H-1,5-diazonin-6-one.

8. 2,3,4,5,7,8 - hexahydro - 9 - (2 - thienyl) - 6H - 1,5-diazonin-6-one.

9. 3,4-dihydro-3,5,-dimethyl-1,6 - benzodiazocin-2(1H-one.

10. 3,4 - dihydro - 5 - phenyl - 1,6 - benzodiazocin - 2-(1H)-one.

No references cited.

WALTER A. MODANCE, *Primary Examiner.*

ROBERT T. BOND, *Assistant Examiner.*